April 13, 1965  G. E. ALGATT ETAL  3,178,637
APPARATUS FOR TESTING LAMPS
Filed June 2, 1961  2 Sheets-Sheet 1
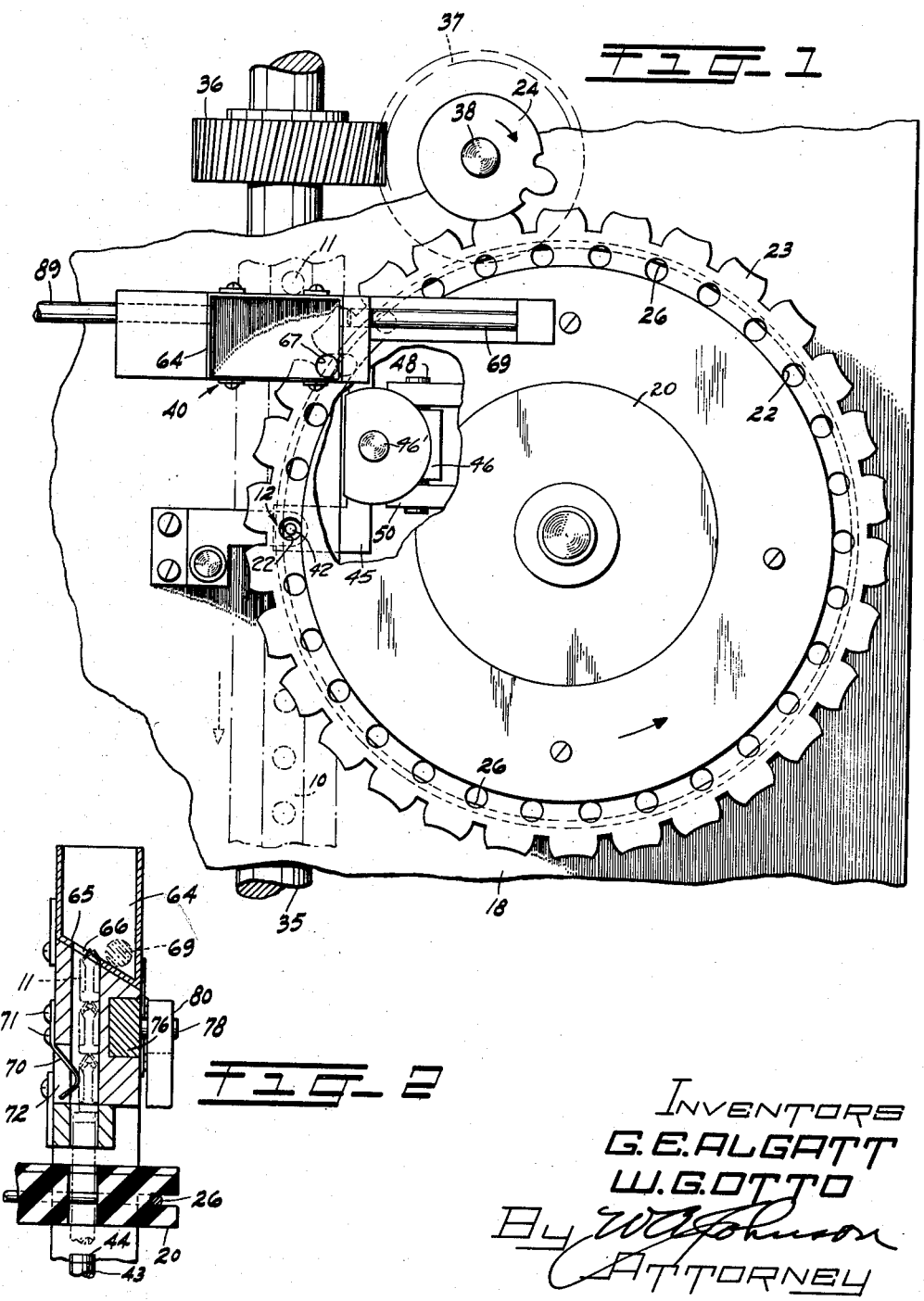
INVENTORS
G. E. ALGATT
W. G. OTTO
By W. Johnson
ATTORNEY April 13, 1965   G. E. ALGATT ETAL   3,178,637
APPARATUS FOR TESTING LAMPS
Filed June 2, 1961   2 Sheets-Sheet 2
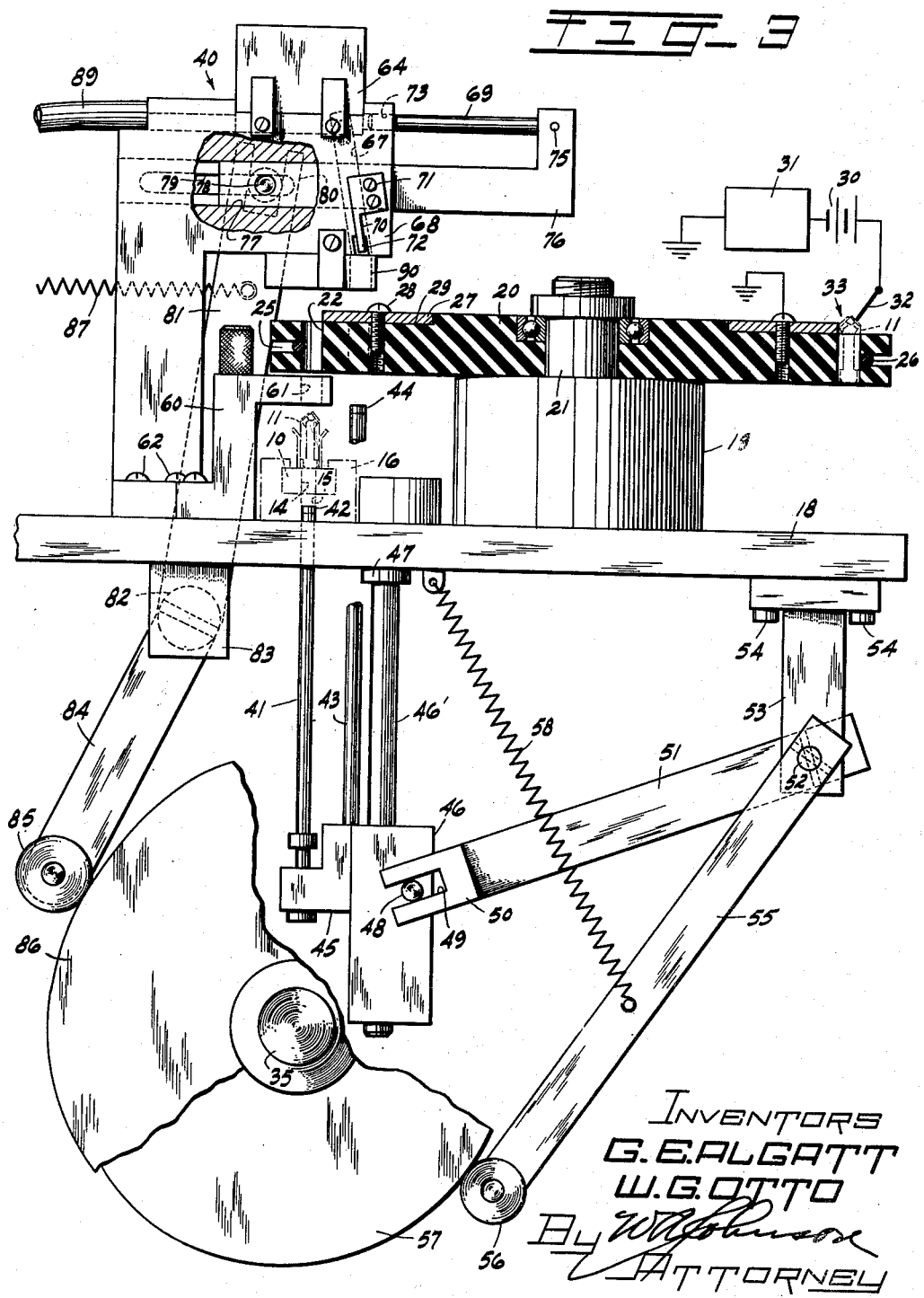

United States Patent Office 3,178,637
Patented Apr. 13, 1965

3,178,637
APPARATUS FOR TESTING LAMPS
George E. Algatt, Allentown, and Willard G. Otto, Schnecksville, Pa., assignors to Western Electric Company Incorporated, New York, N.Y., a corporation of New York
Filed June 2, 1961, Ser. No. 114,437
5 Claims. (Cl. 324—20)

This invention relates to apparatus for testing lamps, particularly telephone switchboard lamps.

In the present system of finishing switchboard lamps, as disclosed in applicants' co-pending application, Serial No. 114,438, filed June 2, 1961, bar type holders are provided with equally spaced openings therein for receiving and holding the lamps. The bars, loaded with lamps, are advanced either singly, or in groups, to certain work areas of the system where the assembly of the lamps is completed. Finally, the bars are advanced to an ejecting area whereat the lamps are removed therefrom.

The object of the present invention is a simple, efficient, and practical apparatus for testing lamps.

In accordance with the object, the apparatus is used for testing lamps which are moved successively in elongated bars or holders having apertures therein to a loading station. A wheel, mounted for rotation about its axis, is provided with a plurality of equally spaced apertures radially positioned adjacent the periphery of the wheel, while means is disposed intermediate the ends of the apertures to removably hold the lamps therein. A loading element is reciprocably mounted at the loading station to move through each aperture in the holder to move a lamp from the holder and into an aligned aperture of the wheel. Subsequently, means is provided to test the lamps in the wheel.

More specifically, the wheel is driven in timed relation with an advancing means for the holder and, during intervals of rest, an actuator is provided for the loading element and also for an ejecting element operated by a cam so that, simultaneously, the loading element moves a lamp out of the holder and into an aperture of the wheel at the loading station, while the ejecting element moves a tested lamp out of its aperture in the wheel and into a slanting guide which directs the ejected lamps singly into a trough where additional cam operated means is provided to advance the lamps longitudinally in the trough.

Other objects and advantages will be apparent from the following detailed description when considered in conjunction with the accompanying drawings wherein:

FIG. 1 is a fragmentary top plan view of the apparatus, portions thereof being broken away;

FIG. 2 is a fragmentary vertical sectional view of the apparatus adjacent the ejecting station; and FIG. 3 is a vertical sectional view of the apparatus.

The apparatus is mounted near an exit end of the lamp finishing system shown in the aforementioned co-pending application, where bars or holders 10 are moved intermittently in the direction of the arrow to present equally spaced lamps 11 carried thereby to a loading station, indicated generally at 12. The holders 10 are provided with apertures 14 for receiving the lamps, each aperture being capable of alignment with an opening 15 in a track 16 along which the holders are moved intermittently.

The apparatus includes a table 18 mounted at a fixed position for supporting the track 16 and also for supporting a base 19 on which a wheel 20 is disposed. The wheel 20 is mounted for rotation on a spindle 21 supported by the base 19. The outer portion of the wheel is provided with a plurality of like apertures 22 equally spaced and radially positioned about its axis. There is also provided teeth 23 of the contour shown in FIG. 1, at the periphery of the wheel, for cooperation with a driving element 24 adapted, when rotated in the direction of its arrow, to impart intermittent movement to the wheel in a counterclockwise direction. A groove 25 is cut in the periphery of the wheel 20 to a depth such that it communicates with the apertures 22 so that a retaining element 26 in the form of a flexible band, circular in cross-section, will extend like distances in all of the apertures 22 to removably hold the lamps 11 in the apertures. The wheel 20 is formed of a suitable dielectric material and an annular member 27 of conductive material is mounted at 28 in a recess 29 of the wheel, the periphery of the element 27 extending to and registering with the walls of the apertures 22 so as to permit electrical contact with the inner terminals of each lamp 11.

In the present instance, the conductive element 27 is disposed in a grounded circuit which includes a source of potential 30, a testing unit 31, and a contact 32 positioned to engage each of the outer terminals when their lamps are moved into a testing position, indicated at 33. In this manner, the lamps are tested.

A drive shaft 35 rotatably supported by suitable means, not shown, beneath the table 18 has a helical gear 36 mounted thereon which interengages a helical gear 37 of a vertical shaft 38, the driving element 24 being mounted on the upper end thereof.

As set forth in the aforementioned co-pending application, the bars or holders 10, when advanced longitudinally, are moved rapidly each second and in order that the wheel 20 may have intervals of rest corresponding with the intervals of rest of the holder 10, the driving means for the wheel, including the element 24, causes the wheel to move rapidly during the first portion of each second and remain idle for the remaining portion of each second so that a lamp may be removed from the aperture 14 of holder 10 and inserted into its corresponding aperture 22 of the wheel at the loading station 12, and, at the same time, a tested lamp may be ejected from the wheel at an ejecting station 40.

This means includes a loading element 41 having a cushion 42 of a suitable material mounted on its upper end and an ejecting element 43 with a cushion 44 of similar material to that of the cushion 42 mounted on its upper end. In FIG. 3, a portion of the element 43 is broken away due to the fact that it is located a short distance in back of the element 41 to align with an aperture 22 at the ejecting station. The lower ends of the elements 41 and 43 are supported by an extension 45 of an actuator 46. The actuator has a longitudinal aperture therein and through this aperture is provided a reciprocally movable guide rod 46' secured at its upper end 47 to the underside of the table 18. A pin 48 extends through the actuator 46 and also through aligned notches 49 of a yoke 50 mounted on an end of a lever 51. The lever 51 is mounted fixedly on one end of a spindle 52 which is rotatably supported by a bracket 53 mounted at 54 on the underside of the table 18.

A cam lever 55 has one end fixedly mounted on the spindle 52 and a cam follower 56 mounted on the other end thereof, where it is caused to follow the contour of a cam 57 by the force of a spring 58. The contour of the cam 57 is such that, during each interval of rest of the wheel 20, it will control movement of the levers 55 and 51 against the force of the spring 58 to move the elements 41 and 43 through their operating cycles.

Due to the fact that there is some distance between the holder 10 at the loading station and the aperture 22 in the wheel at this location, a guide 60 with an aperture 61 is disposed in alignment with the lamp and the aperture 22 at the loading station to assure guidance of the lamp into the aperture of the wheel. The guide 60 is mounted at 62 on the table 18.

A trough 64 is mounted at the ejecting station 40 and is provided with a slanting bottom 65 having an opening 66 therein communicating with a guide 67. The guide 67, in reality, is an aperture in a head 68 disposed in a tilted or angular position so that the successive lamps 11 moved through the guide and finally caused to drop into the trough 64 will fall in a given direction. The slanting surface of the bottom 65 also controls the positioning of the successive lamps in the trough to align them with a push rod 69. A retaining spring 70 mounted at 71 on the head 68 extends into an opening 72 to engage the lowermost lamp in the guide 67, but permits the lamps to be moved upwardly in the guide and eventually into the trough 64. The push rod 69 has its left end (FIG. 3) disposed in a guiding aperture 73 of the head 68. The right end of the push rod 69 is fixed at 75 to a vertical portion of a slide 76 extending into a guideway or aperture 77 of the head 68.

A pin 78 extending through the slide 76 extends also through an elongated aperture 79 in a side wall of the head for connection with a bifurcated end 80 of a lever 81. The other end of the lever 81 is fixedly mounted on a spindle 82 which is supported by a bracket 83, the bracket, in turn, being supported by the table 18. The upper end of a cam lever 84 is also fixedly mounted on the spindle 82 and provided at its lower end with a cam follower 85 which rides upon a cam 86 mounted on the drive shaft 35.

The lever 81 is urged counterclockwise normally by a spring 87 causing the cam follower 85 to ride on the cam 86 and be controlled thereby to cause repeated operating cycles of the slide 76 to advance the successive lamps deposited in the trough 64 through a chute 89 leading to a packaging machine, not shown.

*Operation*

During the continuous rotation of the drive shaft 35, the drive element 24 will impart rapid intermittent motions counterclockwise to the wheel 20 in timed relation with the advancing of the holder 10, and during the intervals of rest between each motion the cam 57 will cause operation of the actuator 46 to move elements 41 and 43 through their operating cycles simultaneously.

The element 41 moves through the aperture 14 of the holder 10 to move the lamp 11 through the aperture 61 of the guide 60 and into the aperture 22 of the wheel 20 where the lamp will be held by the retaining element 26. The simultaneous action of the ejecting element 43 will result in the movement of a lamp from an aperture 22 in the wheel 20 at the ejecting station 40 through an aperture in an auxiliary guide 90 and into the guide 67 where it will be held by the spring 70 until the subsequent lamps are moved out of the wheel and into the guide 67 to eventually advance leading lamp out of the guide and through the slanting bottom of the trough.

The action of the slide 76 and the push rod 69, originating with the cam 86, follows the action of the elements 41 and 43 so that the leading lamp is permitted to drop into the trough and be guided by the slanting position of the bottom 65 to lie in a position in front of the push rod 69, prior to the beginning of the cycle of the operation of the push rod to advance this lamp and those preceding it toward and into the chute 89. Furthermore, the testing means or the test set 31, interposed between the loading station and the ejecting station, will function to test each lamp.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. Apparatus for testing lamps which comprises:
   a holder having an opening for holding at least one lamp to be tested,
   a wheel mounted for rotation about its axis and having a plurality of equally spaced apertures extending through the wheel, the apertures extending in parallel relationship with each other and the axis of the wheel,
   means for providing relative movement between the wheel and holder to successively locate each aperture of the wheel in vertical alignment with the holder opening at a loading area,
   a loading element reciprocably mounted at the loading area and in vertical alignment with the holder opening and the aperture of the wheel moved to the loading area,
   means operable for reciprocably moving the loading element, upon alignment of the aperture in the wheel and a lamp in the holder opening, to move a lamp from the holder into the aligned aperture of the wheel so that the walls of the lamp engage the aperture,
   retaining means disposed in the wheel apertures intermediate the end portions thereof for removably holding lamps received therein, and
   means for testing the lamps received in the wheel apertures.

2. An apparatus for testing lamps according to claim 1 which includes:
   a receptacle mounted above the wheel at an ejecting area and having an opening aligned with a tested lamp in the aperture of the wheel,
   an ejecting element normally disposed beneath the wheel at the ejecting area, and
   means operable to reciprocate the ejecting element when the wheel is at rest at the ejecting area to move the ejecting element through the aligned aperture in the wheel to move the tested lamp from the wheel and into the receptacle.

3. An apparatus for testing lamps according to claim 1 which includes:
   a receptacle mounted above the wheel at an ejecting area and having an opening aligned with a tested lamp in the aperture of the wheel,
   an ejecting element normally disposed beneath the wheel at the ejecting area,
   means operable to reciprocate the ejecting element when the wheel is at rest at the ejecting area to move the ejecting element through the aligned aperture in the wheel to move the tested lamp from the wheel and into the receptacle,
   an actuator disposed beneath the wheel and adapted to support the loading and ejecting elements in alignment with the lamps at their respective loading and ejecting areas,
   means to support the actuator for reciprocable movement, and
   means operable to reciprocate the actuator.

4. An apparatus for testing lamps according to claim 1 which includes:
   a receptacle mounted above the wheel at an ejecting area and having an opening aligned with a tested lamp in the aperture of the wheel,
   an ejecting element normally disposed beneath the wheel at the ejecting area,
   means operable to reciprocate the ejecting element when the wheel is at rest to move the ejecting element through the aligned aperture in the wheel to move the tested lamp out of the wheel and into the receptable,
   an actuator disposed beneath the wheel and adapted to support the loading and ejecting elements in alignment with their respective loading and ejecting areas, a drive shaft rotatable continuously adjacent the actuator, a cam mounted on the drive shaft and rotated thereby, and means responsive to the rotation of the cam for reciprocating the actuator after each movement of the wheel.

5. An apparatus for testing lamps according to claim 1 which includes:

an annular groove formed in the periphery of the wheel which communicates with the apertures in the wheel, and a flexible ring disposed in the groove and extending transversely to portions of all the apertures in the wheel to constitute the means to removably hold the lamps received in the apertures of the wheel.

References Cited by the Examiner

UNITED STATES PATENTS

| | | | |
|---|---|---|---|
| 1,808,301 | 6/31 | Ferguson et al. | 324—23 X |
| 2,278,697 | 4/42 | Gould | 324—21 |
| 2,986,275 | 5/61 | Glaubke et al. | 209—81 |
| 2,997,779 | 8/61 | Smart | 324—20 X |

WALTER L. CARLSON, *Primary Examiner.*

SAMUEL BERNSTEIN, JAMES W. LAWRENCE,
*Examiners.*